United States Patent [19]
Takagi et al.

[11] 3,752,630
[45] Aug. 14, 1973

[54] APPARATUS FOR CONTINUOUS PRODUCTION OF THERMOPLASTIC SYNTHETIC RESIN TUBE WITH HEAT-SHRINKING PROPERTY

[76] Inventors: Haruo Takagi, 9, Saiwaicho-dori, 5-chome, Naniwa-ku, Osaka; Yasuo Yamagishi, 660 Shenke-cho, Sakai, both of Japan

[22] Filed: Jan. 5, 1972

[21] Appl. No.: 215,687

Related U.S. Application Data

[63] Continuation of Ser. No. 840,942, July 11, 1969, abandoned.

[52] U.S. Cl. .............................. 425/325, 425/392
[51] Int. Cl. .............................................. B29d 23/04
[58] Field of Search .................. 425/325, 326, 324, 425/392

[56] References Cited
UNITED STATES PATENTS

| | | |
|---|---|---|
| 3,090,998 | 5/1963 | Heisterkamp et al. ........... 425/326 X |
| 2,955,321 | 10/1960 | Fortner et al. ................... 425/326 X |
| 3,160,918 | 12/1964 | Berggren et al. ................ 425/392 X |
| 3,246,061 | 4/1966 | Blatz .................................... 425/324 |
| 3,294,882 | 12/1966 | Lutzmann et al. ..................... 264/95 |
| 3,377,413 | 4/1968 | Jansson et al. ................... 425/325 X |

*Primary Examiner*—Robert L. Spicer, Jr.
*Attorney*—J. C. Holman, Herbert I. Cantor et al.

[57] ABSTRACT

This invention provides the improved method and apparatus of producing continuously thermoplastic synthetic resin tube with a heat-shrinking property, whereby a fresh thermoplastic synthetic resin tube extruded from an extruder is expanded by fitting same over a conical-topped cylindrical member of larger diameter while in a half-solidified state and wound onto a bobbin through take-up rolls after cooled down with suitable cooling devices. This type of tube is increasingly used as a film-covering or sealing material for dry cells, bamboo rods, bottle-caps, etc. because of it shrinking to the original diameter by heating.

1 Claim, 3 Drawing Figures

Patented Aug. 14, 1973
3,752,630
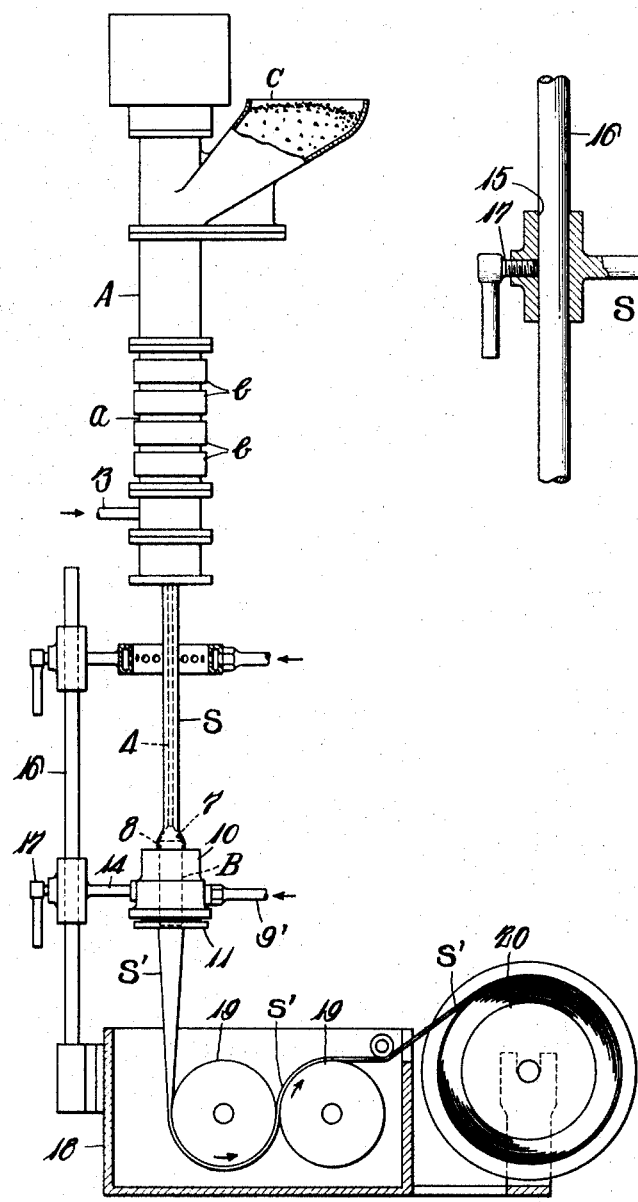
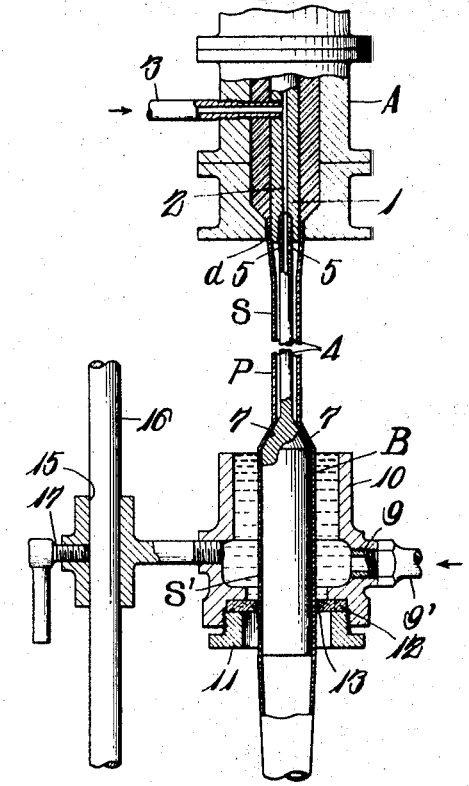
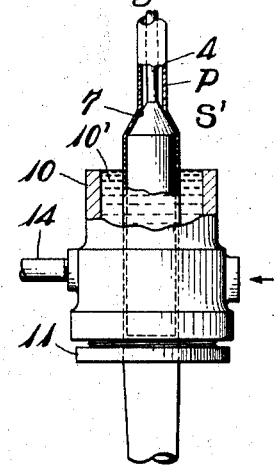
INVENTORS
HARUO TAKAGI
YASUO YAMAGISHI
BY Holman, Glascock, Downing
& Seebold
ATTORNEYS

APPARATUS FOR CONTINUOUS PRODUCTION OF THERMOPLASTIC SYNTHETIC RESIN TUBE WITH HEAT-SHRINKING PROPERTY

RELATED U.S. APPLICATION

This is a continuation of Ser. No. 840,942, filed July 11, 1969, now abandoned.

BACKGROUND OF THE INVENTION

This invention relates to a method and an apparatus for continuous production of thermoplastic synthetic resin tube having a heat-shrinking property and more particularly to improvements of the method and apparatus for continuous production of such type of tube whose diameter becomes smaller when heated.

It is known that when a fresh thermoplastic synthetic resin tube was expanded while still in a half-solidified state, to a larger diameter than that in which it had originally been extruded from an extruding machine, and stored as a finished product after cooled down completely, it would shrink to the original diameter when heated again, after having been fitted over a material, thereby effecting air-tight sealing or covering of such material. Because of this characteristic, this kind of tube has been finding an increasing outlet lately in such end-uses as sealing and/or covering material for dry cells, bamboo poles and rods, etc.

In accordance with known methods, however, a fresh tube extruded is once cooled and solidified, which is then heated to soften and expanded to a desired diameter by inflation or other processes and finally left to be cooled and stored as a finished product. The known methods have therefore a drawback in that they are not suited for continuous product of such type of tube and therefore highly inefficient and uneconomical.

SUMMARY OF THE INVENTION

This invention has for its principal object to provide the improved method and apparatus of producing such tubes that, with the use of the present invention, it becomes possible to produce continuously and automatically and with high efficiency the thermo-plastic synthetic resin tube with a heat-shrinking property, ensuring great economical advantage.

The nature and other advantages of this invention will be known more clearly from the following description made with reference to the accompanying drawings.

BRIEF DESCRIPTION OF DRAWINGS

FIG. 1 is a side view partly in section of an embodiment of the present invention, FIG. 2 is a detailed side view in vertical section of part of the apparatus shown in FIG. 1, where a fresh tube extruded from an extruder is expanded and solidified, and, FIG. 3 is a side view partly in vertical section of the tube-expanding device in FIG. 2, showing it at a lower mounting position than shown in FIG. 2.

DETAILED DESCRIPTION OF THE INVENTION

Referring to the embodiment shown in the drawings, A denotes an extruder of the conventional upright type comprising a screw conveyor internally provided (not shown in the drawings), a pressure drum $a$ to be heated by a heating means $b$, a hopper C to take in material resin and a nozzle $d$ from which the material resin is extruded into tubular shape.

Provided in the central portion of a mould-center member 1 disposed inside the nozzle $d$ is an air passage 2 to which is linked a pipe 3 which sends air into said air passage 2 from outside. To the end of said mould-center member 1 is linked a small pipe 4 of suitable length in such a way that the air passage 2 provided internally of said center member 1 joins the hollow interior of the pipe 4, while an air outlet 5 is provided in the base end of said pipe 4 so that the air sent in from outside through the pipe 3 may be emitted into the pipe 4.

To the base end of said pipe 4 is linked another mould-center member B for expanding a tube diameter, consisting of a cylindrical body 8 having a conical-shaped top portion 7 with a smooth-expanding sloped surface.

Mounted about the outer periphery of the tube-expanding mould-center B is a cylindrical water-cooling device 10 which is disposed in such a manner as to provide a water chamber 10' in a space defined between the outer periphery of said mould-center B and the inner periphery of said cylindrical device 10. At the lower end of said water-cooling device 10 is provided a packing 12 having an aperture 13 in its center of such a diameter as to leave a barely sufficient space between the periphery of said aperture 13 and the periphery of base end of the mould-center B which is accommodated therein, to allow the passage of the expanded tube therethrough, and then an annular screw 11 is mounted from below in said water-cooling device 10 to tighten up the packing 12.

To a water inlet 9 of the water-cooling device 10 is rigidly connected a water conduit 9' through which the cooling water is continuously fed in from outside with the water constantly overflowing from the water chamber 10' thereby keeping the water level and temperature of the cooling water always uniform.

The water-cooling device 10 has a horizontally projecting bracket 14 carrying at its end a vertically disposed hole 15 which accommodates a support pole 16 therethrough. The cylindrical device 10 is therefore held in position firmly by means of the bracket 14 which is fastened rigidly to the vertical support pole 16 by means of a set screw 17. The position of the bracket member 14 can be adjusted up and down by the adjustment of the set screw 17, thereby moving the position of the device 10 upward or downward in relation to the tube-expanding center member B.

Immediately below the water-cooling device 10 is provided a water bath 18 for cooling the expanded tube, in which a set of paralleled take-up rolls 19, 19 are disposed so as to draw out the expanded tube S' against the frictional resistance of the conical-topped mould center B. In parallel with the take-up rolls 19,19 and spaced slightly therefrom, a winding drum 20 is provided.

In the accompanied drawings is shown a modified embodiment of the invention, in which an air-cooling device is provided immediately underneath the tip of the extruding machine A, so that the fresh resin tube just after extrusion may be cooled there before advancing further. However, said air-cooling device is not entirely necessary, for the reasons that the tube to be expanded by the conical-topped center B is neither a melt body of high temperature just after extrusion nor a perfectly-cooled solid body but an intermediate state of both, being a half-solidified body in the process of cooling to solidification which still possesses sufficient elasticity (in the case of a vinylchloride tube extruded at a temperature of approximately 130°, C, the point cooled to a range of 100°– 70° C is suitable.) Accordingly, in such cases as the production is carried out in a place where the room temperature is high or as the tube-expanding mould center B is provided at a short distance from the nozzle d, the artificial cooling device as illustrated may be necessary, but, where the production is carried out in a place of low room temperature, such an artificial cooling device is not always necessary, because the tube in process is cooled to a suitable degree by the outside air simultaneously with the extrusion.

Next, referring to the method of manufacturing the heat-shrinkable resin tube by the use of the apparatus, the moulded tubular body S extruded from the extruding machine A is solidified to a half-solid state, whereupon it is fitted over the tube-expanding mould center B to be expanded to a desired diameter, and just after the said expansion, it is cooled down, passed over the mould center and then drawn into the water bath 18, where it is perfectly cooled and solidified into the finished tube.

The nature of the present invention will be known more clearly from the following detailed description made of the operating sequence of each device provided in the apparatus: The air is sent through the pipe 3, air passage 2, and air outlet 5 into the inner part of the fresh small-diameter tube S which is continuously extruded from the nozzle d of the extruding machine A. The tube S advances forth, retaining the same cylindrical shape as it was originally extruded, and when it was brought to a half-solidified state by the cooling effect of the air on the tube surface, it is fitted over the tube-expanding mould center B. Then, in the course of sliding along the conical-shaped surface 7 of top portion of said mould center B, said tube S is gradually expanded and when it passes the sloped surface and reaches the outer periphery of the cylindrical body 8, its diameter is fully expanded to a desired size to become an expanded tube S', whereupon it is cooled by the cooling water filled in the water chamber 10' which surrounds the said cylindrical body 8.

The expanded tube S' thus cooled is drawn out by a set of the take-up rolls 19,19 provided right beneath it, perfectly cooled in the water bath 18 and finally wound onto the following winding drum 20. It may be added that the advancing motion of the moulded tube extruded from the extruding machine A is caused solely by the tractive force of the take-up rolls 19,19.

The cold water filled in the water chamber 10' inevitably causes some leakage at the contacting part between the aperture 13 of the packing 12 provided at the bottom of said water chamber and the peripheral surface of the expanded tube S' passing therethrough, but such leakage is indeed rather effective for cooling the expanded tube than harmful.

The finished tube (the expanded tube) is thus produced by forcibly expanding its diameter by means of the diameter-expanding mould center B while half-solidified and in its expanded state, solidified into a tube of desired diameter. Accordingly, when it is fitted over a material and heated, it shrinks to the original diameter given by the extruding machine.

We claim:

1. Apparatus for continuous production of thermoplastic synthetic resin tube with heat-shrinking property, comprising an extruder means for extruding the resin in the form of a tube, a mould center member linked to the end of said extruder means in alignment therewith for expanding a tube extruded, said mould center member comprising a conical-shaped portion having an apex disposed toward said extruder means, and a cylindrical portion joined to the base of said conical-shaped portion to form a juncture with said conical-shaped portion, a cooling means mounted about said cylindrical portion of said mould center member, mounting means adjustably mounting said cooling means for axial movement relative to said cylindrical portion of said mould center member, said cooling means being adjustably positioned at the juncture of said conical-shaped portion and cylindrical portion of said mould-center member for setting the expanded tube thereat to afford only diametrical heat-shrink properties, or below said juncture for setting the expanded tube intermediately of said mould-center member to afford both diametrical and axial heat-shrink properties to said tube, and take-up rolls provided underneath said cooling means.

* * * * *